United States Patent
Gardner

(10) Patent No.: US 7,945,816 B1
(45) Date of Patent: May 17, 2011

(54) COMPREHENSIVE END-TO-END STORAGE AREA NETWORK (SAN) APPLICATION TRANSPORT SERVICE

(75) Inventor: James A. Gardner, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1179 days.

(21) Appl. No.: 11/290,281

(22) Filed: Nov. 30, 2005

(51) Int. Cl.
*G06F 11/00* (2006.01)
*H04L 1/18* (2006.01)

(52) U.S. Cl. .......................................... 714/43; 370/498

(58) Field of Classification Search .................. 709/230; 714/43, 707, 708, 749, 775; 370/498, 470, 370/479
See application file for complete search history.

(56) References Cited

U.S. PATENT DOCUMENTS

| | | | | |
|---|---|---|---|---|
| 5,392,280 | A * | 2/1995 | Zheng | 370/353 |
| 5,991,298 | A * | 11/1999 | Hunt et al. | 370/390 |
| 6,134,647 | A * | 10/2000 | Acton et al. | 712/28 |
| 6,160,813 | A * | 12/2000 | Banks et al. | 370/422 |
| 6,163,856 | A * | 12/2000 | Dion et al. | 714/4 |
| 6,311,186 | B1 * | 10/2001 | MeLampy et al. | 707/10 |
| 6,405,337 | B1 * | 6/2002 | Grohn et al. | 714/749 |
| 6,502,205 | B1 * | 12/2002 | Yanai et al. | 714/7 |
| 6,640,278 | B1 | 10/2003 | Nolan et al. | |
| 6,731,646 | B1 * | 5/2004 | Banks et al. | 370/422 |
| 6,763,373 | B2 * | 7/2004 | Shiigi | 709/206 |
| 6,810,031 | B1 * | 10/2004 | Hegde et al. | 370/351 |
| 6,873,797 | B2 * | 3/2005 | Chang et al. | 398/51 |
| 6,976,186 | B1 * | 12/2005 | Gardner | 714/4 |
| 7,145,877 | B2 * | 12/2006 | Natarajan et al. | 370/235 |
| 7,239,641 | B1 * | 7/2007 | Banks et al. | 370/397 |
| 7,301,898 | B1 * | 11/2007 | Martin et al. | 370/229 |
| 2001/0047412 | A1 * | 11/2001 | Weinman, Jr. | 709/225 |
| 2002/0007404 | A1 * | 1/2002 | Vange et al. | 709/217 |
| 2002/0120837 | A1 * | 8/2002 | Maxemchuk et al. | 713/153 |
| 2002/0152303 | A1 * | 10/2002 | Dispensa | 709/224 |
| 2002/0154634 | A1 * | 10/2002 | Basso et al. | 370/390 |
| 2003/0002100 | A1 * | 1/2003 | Izadpanah | 359/124 |
| 2003/0016683 | A1 * | 1/2003 | George et al. | 370/404 |
| 2003/0026267 | A1 * | 2/2003 | Oberman et al. | 370/397 |
| 2003/0084290 | A1 | 5/2003 | Murty et al. | |
| 2003/0093638 | A1 * | 5/2003 | Margerie et al. | 711/162 |
| 2003/0126136 | A1 * | 7/2003 | Omoigui | 707/10 |
| 2003/0144894 | A1 * | 7/2003 | Robertson et al. | 705/8 |
| 2003/0185154 | A1 * | 10/2003 | Mullendore et al. | 370/230 |
| 2003/0195976 | A1 * | 10/2003 | Shiigi | 709/230 |
| 2004/0006706 | A1 * | 1/2004 | Erlingsson | 713/200 |
| 2004/0054777 | A1 * | 3/2004 | Ackaouy et al. | 709/225 |
| 2004/0202155 | A1 * | 10/2004 | Natarajan et al. | 370/360 |
| 2004/0243699 | A1 * | 12/2004 | Koclanes et al. | 709/224 |
| 2004/0249899 | A1 * | 12/2004 | Shiigi | 709/206 |
| 2005/0044197 | A1 * | 2/2005 | Lai | 709/223 |

(Continued)

OTHER PUBLICATIONS

U.S. Appl. No. 10/228,776, filed Aug. 27, 2002.

(Continued)

*Primary Examiner* — Krisna Lim

(57) ABSTRACT

Disclosed is a method and system for transmitting data on a data channel from a source to a destination. The data channel has a plurality of wavelength channels and a throughput. The system and method include a storage application for multicasting data on each of the plurality of wavelength channels, a storage protocol extension device using buffer credits to adjust the throughput during the multicasting, and an application optimization device for managing data channel latency to achieve asymmetric mirroring behavior at the same time as the multicasting.

15 Claims, 5 Drawing Sheets

U.S. PATENT DOCUMENTS

2005/0091111 A1* 4/2005 Green et al. .................... 705/14
2005/0228835 A1   10/2005 Roa
2006/0218210 A1*  9/2006 Sarma et al. .................. 707/204
2007/0127366 A1*  6/2007 Banks et al. .................. 370/222

OTHER PUBLICATIONS

U.S. Appl. No. 11/203,420, filed Aug. 12, 2005.
U.S. Appl. No. 11/207,312, filed Aug. 19, 2005.

* cited by examiner

US 7,945,816 B1

COMPREHENSIVE END-TO-END STORAGE AREA NETWORK (SAN) APPLICATION TRANSPORT SERVICE

CROSS REFERENCE TO RELATED APPLICATIONS

This application is related to commonly assigned patent application Ser. No. 10/228,776 filed Aug. 9, 2005, entitled "Asymmetric Data Mirroring", now the U.S. Pat. No. 6,976,186 issued Dec. 13, 2005, which is incorporated herein by reference. This application is also related to commonly assigned patent application Ser. No. 11/203,420 filed Aug. 12, 2005, entitled "Asymmetric Data Mirroring", now the U.S. Pat. No. 7,549,080 issued on Jun. 16, 2009, which is incorporated herein by reference. This application is also related to commonly assigned patent application Ser. No. 11/207,312 filed Aug. 19, 2005, entitled "Method and System for Long Haul Optical Transport for Applications Sensitive to Data Flow Interruption", now the U.S. Pat. No. 7,839,766 issued on Nov. 23, 2010, which is incorporated herein by reference.

BACKGROUND OF THE INVENTION

The present invention relates generally to storage area networks, and more particularly to a comprehensive, end-to-end storage area network (SAN) application transport service.

With the advent of and growth of the Internet, the availability of data has become increasingly important. Many corporations need access to their data during most, if not all, hours of the day. For example, people may be searching the web for a particular piece of information at any time of day. If the information is associated with a corporation's web site, the corporation may lose customers if their web site is not functioning properly or if the data cannot be retrieved at the time of search. As a result, data storage and availability have become extremely important to businesses in today's competitive landscape.

Data storage devices may fail as a result of system malfunctions, weather disasters, or other types of unforeseen conditions. Corporations typically have a remote backup storage device to ensure data availability when a local storage device fails. Data redundancy is also referred to as data mirroring and typically involves the submission of simultaneous write requests to multiple storage devices (i.e., the local and remote data storage devices).

Typically, in a data mirroring arrangement, a server is attached or connected to a local data storage device as well as to a remote data storage device with the data from each storage device mirroring that of another (or each other).

The distance at which data can reliably be transmitted to a remote storage device also becomes relevant to performance of a data storage network and data security. Specifically, the shorter the distance between a server and data sites, the more quickly the data can be synchronized at the data sites. Maintaining synchronization between data at mirrored sites is often highly desirable. Synchronization is the ability for data in different data sites to be kept up-to-date so that each data store contains the same information. One way to accomplish synchronization is by all mirrored storage devices acknowledging receipt of an input/output (I/O) request from a requesting application before the application may generate the next I/O request. As the distance between mirrored sites increases, synchronization becomes harder to achieve using existing mirroring techniques as the application generating the I/O request is slowed while awaiting acknowledgment from the remote storage device.

It is possible to obtain synchronization using existing techniques if the physical distance between the mirrored sites is less than approximately twenty-five (25) miles (i.e., 40 km). For greater distances, existing techniques may not provide the synchronization that is needed for maintaining data security in case of a wide-spread calamity.

Also, the greater the distance between the mirrored sites, the less likely a situation (e.g., a weather disaster or a system failure) will affect both the local storage device and the remote storage device. Further, when data is transported over increasing distances, the throughput associated with the data transfer traditionally experiences "throughput droop". Throughput is defined as the amount of data that can be transmitted across a data channel at any given time. Throughput is often represented graphically relative to distance. Throughput droop is when a throughput curve goes down or "droops" as the transport distance increases. Thus, in order to transmit the maximum amount of data over a data channel, the distance between the server and the remote storage device must often be kept within a reasonable distance (e.g., 25 miles).

A transport interruption event is another problem that may be experienced during data transmission to a remote storage device. This occurs when there is a failure in the data channel. After the failure is recognized, the transmitting party (e.g., server) may then switch the channel used to transmit the data. This is referred to as a switch-to-protect event. When performing this data channel switch, the server has to synchronize the communications with the remote storage device over the new data channel. This resynchronization (after the initial synchronization over the initial data channel) and switching to the new data channel traditionally introduces a disruption (e.g., 40 milliseconds) in the data transmissions until the synchronization is complete.

Thus, there remains a need to provide a comprehensive storage area network (SAN) application transport service that solves the above-mentioned problems.

BRIEF SUMMARY OF THE INVENTION

A system and method for solving the above mentioned problems transmits data on a data channel from a source to a destination. The data channel has a plurality of wavelength channels and an associated throughput. The system and method include a storage application for multicasting data on each of the plurality of wavelength channels, a storage protocol extension device for adjusting the throughput during the multicasting by using buffer credits to determine a capacity of data that can be communicated between the source and the destination, and an application optimization device for managing data channel latency by submitting requests to the source and the destination during a predetermined time period associated with the latency. As described in more detail below, data channel latency is the time required for a signal to traverse the round trip distance between a server (or source) and a remote storage device plus the maximum write time of the remote storage device.

The data channel may be part of an optical network, such as a Fibre Channel network, or a packet-based network, such as a MultiProtocol Label Switching (MPLS) network. The managing of data channel latency can include determining a predetermined time period associated with the latency between the source and the destination, submitting a request to the source and to the destination, and submitting additional requests to the source and the destination during the predetermined time period. The request and the additional requests may be resubmitted to the destination if an acknowledgement is not received. The submission of additional requests to the source and destination may also continue if the acknowledgement is received.

In one embodiment, the system and method determine whether an acknowledgement associated with the request has been received from the destination during the predetermined time period. In another embodiment, the system and method store a copy of each request submitted by the source to the destination in a memory disposed between the source and the destination while the source waits for whether an acknowledgement associated with the request has been received from the destination during the predetermined time period. In one embodiment, the source halts submission of new requests to the destination if the acknowledgement is not received.

These and other advantages of the invention will be apparent to those of ordinary skill in the art by reference to the following detailed description and the accompanying drawings.

DETAILED DESCRIPTION

Data availability, and therefore data storage, has become vitally important to corporations. A failure of a data storage device may result in millions of dollars lost if a corporation's data is not available. As a result, corporations often mirror a local data storage device with a remote data storage device.

Figure 1:
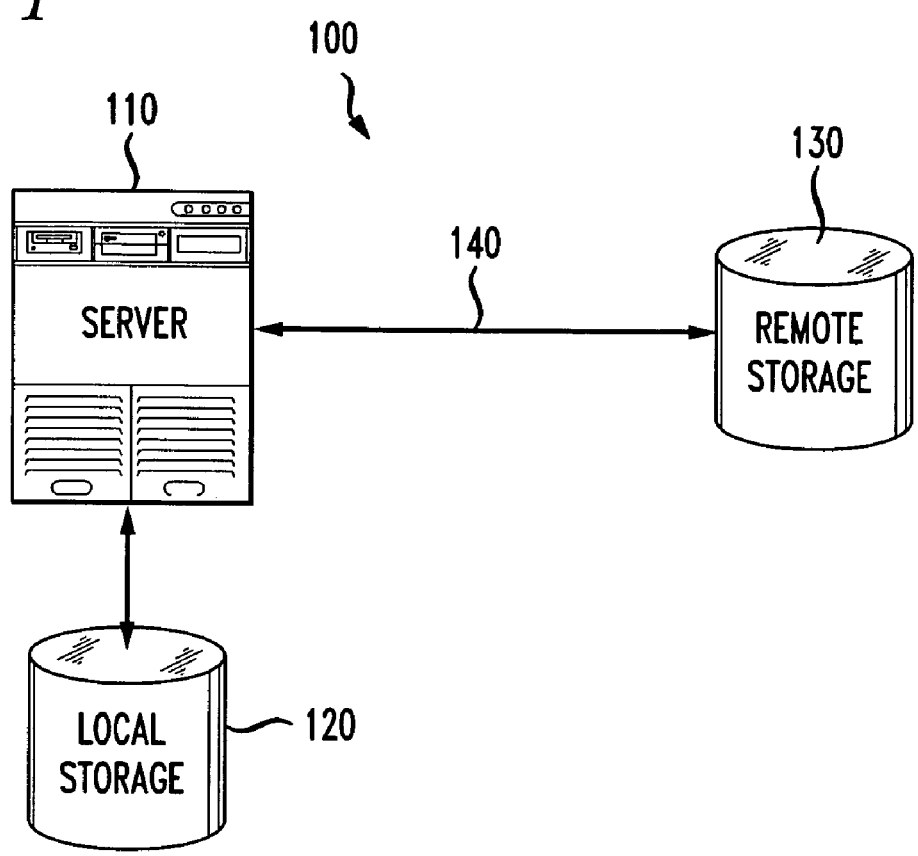
FIG. 1 shows a data mirroring system according to an embodiment of the invention.
Figure 2:
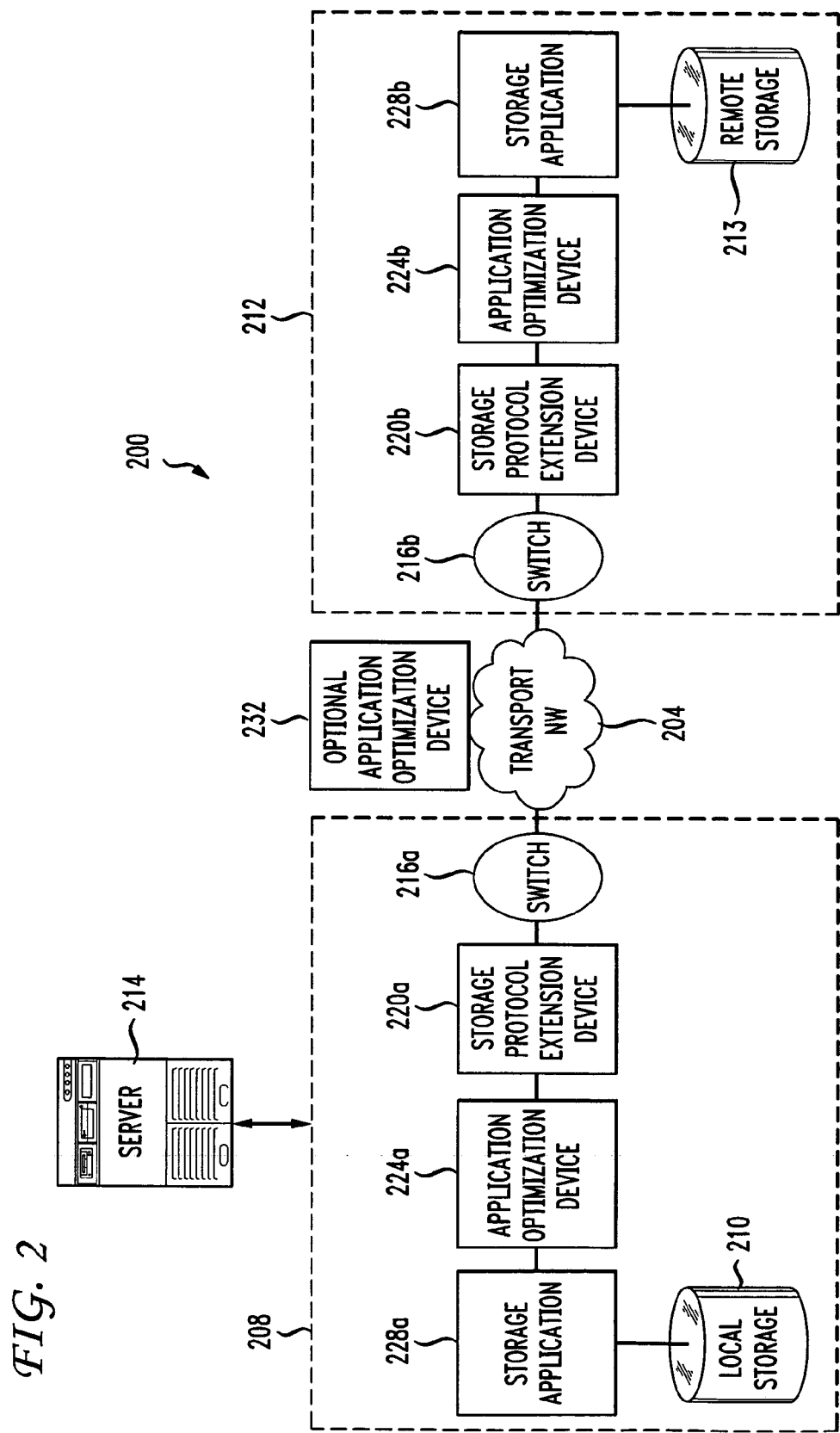
FIG. 2 shows a functional block diagram of the layered SAN transport model in accordance with an embodiment of the invention.

An exemplary data mirroring system 100 is shown in FIG. 1. The data mirroring system 100 includes a server 110, a local storage device 120 and a remote storage device 130. The server 110 and the remote storage device 130 may be connected via a communication link 140. The communication link 140 may be a cable connection or a wireless connection. The cable may be terrestrial, underwater, etc. It may utilize a fiber optic medium. The communication link 140 can also be any combination of these connections (e.g., one portion is a wired connection and one portion is a wireless connection). The network formed by the arrangement of FIG. 1 may be a public or a private network. Further, the functions performed by the server 110 described above and below may instead be performed by a storage application (as shown in FIG. 2).

There exists asymmetry in the distance between the server 110 and the storage devices 120 and 130. The distance between server 110 and local storage device 120 is negligible relative to the distance between server 110 and remote storage device 130. In an asymmetric data mirroring (ADM) method according to exemplary embodiments of the present invention, the server 110 first submits an I/O request (such as a write request of a block of data) to both the local and remote storage devices 120 and 130 and then continues to make additional I/O requests to the devices 120 and 130 over a predetermined time period while waiting for an acknowledgement from the remote storage device 130 for the submitted I/O request. According to this exemplary embodiment, an acknowledgment (within the predetermined time period or time interval) is required for each submitted request. The predetermined time period represents the time needed for a signal to traverse the round trip distance between the server 110 and the remote storage device 130 plus the maximum write time of the remote storage device 130. This time period may also be referred to as the round trip latency or network latency and may be measured or determined by a processor of the server 110. The write time of the remote storage device 130 may be negligible since the request may first be written to cache associated with the remote storage device 130. Therefore an acknowledgement may be submitted by the remote storage device 130 upon receipt of the write request from the server 110.

If the server 110 does not receive an acknowledgement from the remote storage device 130 within the predetermined time period, all further requests to the devices 120 and 130 are halted. At this point, the request for which an acknowledgement is not received as well as all additional requests that have been submitted are resubmitted, block by block, by the server 110 to the remote storage device 130.

It may be appreciated by those skilled in the art that latency between network nodes, such as server 110 and remote storage device 130, may vary as a result of network traffic, etc. Accordingly, multiple readings may be made in order to determine the round trip latency. That is, a number of pings may be submitted by the server 110 to determine the average latency while also noting the minimum and maximum round trip latency values. Furthermore, the latency will change if the distance between the server 110 and the remote storage device 130 is changed for any reason. In this case (i.e., the distance between the server and the remote storage device changes), the latency measurements have to be updated.

FIG. 2 shows a more detailed block diagram of a storage area network (SAN) having a server 214 in communication with a local storage device (i.e., source) 208 (shown with a dashed box) and a remote storage device (i.e., destination) 212 (also shown with a dashed box). SAN 200 includes a transport network 204 to transmit data from the source to the destination 212. In one embodiment, server 214 issues an I/O command to write data to the source 208. The source 208 stores the data in local storage 210 and also transmits the data over the transport network to the destination 212 for storage in remote storage 213.

The transport network 204 may include any number of channels (e.g., fibers) and may have any configuration. The transport network 204 may be an optical network, such as a Fiber Optics network, or may be a packet-based network, such as a Multiprotocol Label Switching (MPLS) network.

In the transport network 204, the data is multicasted over at least two separate wavelength channels (or, in the context of an MPLS network, over two separate data channels). The transport network 204 thereby eliminates the switch-to-protect time traditionally needed when a failure occurs. In particular, because the data is being transmitted over multiple channels, no time is needed to switch to a new channel, synchronize a new data transmission between the source 208 and the destination 212, and then transmit the data over the new channel. Instead, the same data is already being transmitted over multiple wavelength channels before a failure occurs. Thus, no synchronization time is needed if a failure occurs.

The source 208 and destination 212 each have a respective switch 216a, 216b (generally 216). Switch 216 may take the form of a router, Ethernet switch, SAN switch, or any other network element capable of providing input data (e.g., optical input data) to the respective source 208 or destination 212. Switches 216 may, depending on their functionality and on the requirements of the connecting network, include a programmable processor/controller, memory storage, cross-connect, wavelength converter, processing software including arbitration and event correlation modules, and a variety of interface modules for communicatively connecting the switches 216 to the transport network 204 and their respective source 208 or destination 212.

With respect to the multicasting of the data, each switch 216 can determine which wavelength channel to look at for the data. For example, the switches 216 can always obtain the data from a first wavelength channel and ignore the data from the other wavelength channels. If a failure occurs on the first wavelength channel, the switch 216 then switches to another wavelength channel. The determination of which wavelength channel to switch to may be based on an algorithm that the switch 216 executes.

Each switch 216 is in communication with a respective storage protocol extension device 220a, 220b (generally 220). Each storage protocol extension device 220 provides protocol extension techniques such as buffer credits. Buffer credits are used to enable level throughput curves at extended transport distances. Without buffer credits, after a particular distance is reached at which data is being sent over a SAN, the throughput of the network drops sharply. One buffer credit is typically needed for every 2 km of fiber.

Buffer credits enable the production of a more consistent and stable throughput over extended distances. Specifically, the Fibre Channel protocol uses a credit-based algorithm to allow or throttle frame flow based on the capacity of a receiving device's (i.e., storage protocol extension device's) input buffer. To ensure input buffers are not overrun and frames are not dropped, each ingress Fibre Channel port gives out credits called buffer-to-buffer credits (also referred to as buffer credits) to permit a transmitting device (i.e., source storage protocol extension device 220a) to send frames. During the initial communication process, the number of credits that the destination storage protocol extension device 220b can support is exchanged with the source storage protocol extension device 220a. This number determines the number of consecutive data frames that may be transmitted by the source storage protocol extension device 220a before it must receive acknowledgement that the earlier frames have been delivered successfully. Additional credits can only be given when input buffers have been emptied on either end of the link.

Once the data channel is communicating at maximum throughput, the source storage protocol extension device 220a does not load the data channel with additional data (until the source storage protocol extension device 220a receives the next acknowledgement from the destination storage protocol extension device 220b). This prevents loss of data frames that may result if the source extension device 220a races too far ahead of the destination extension device 220b. As the length of a fiber optic cable span increases for a given throughput, the number of buffer credits required to ensure optimum performance increases in direct proportion. Also, as the throughput increases for a given span of fiber optic cable, the required number of buffer credits increases in direct proportion. The storage protocol extension device 220 may be, for example, a CN 2000 (Ciena Corporation) or an UltraNet Storage Director-eXtended (USD-X) (McDATA Corporation).

The storage protocol extension devices 220 are also connected to application optimization devices 224a, 224b (generally 224). The application optimization device 224 manages the latency associated with the transmission of data over the transport network 204.

Figure 3:
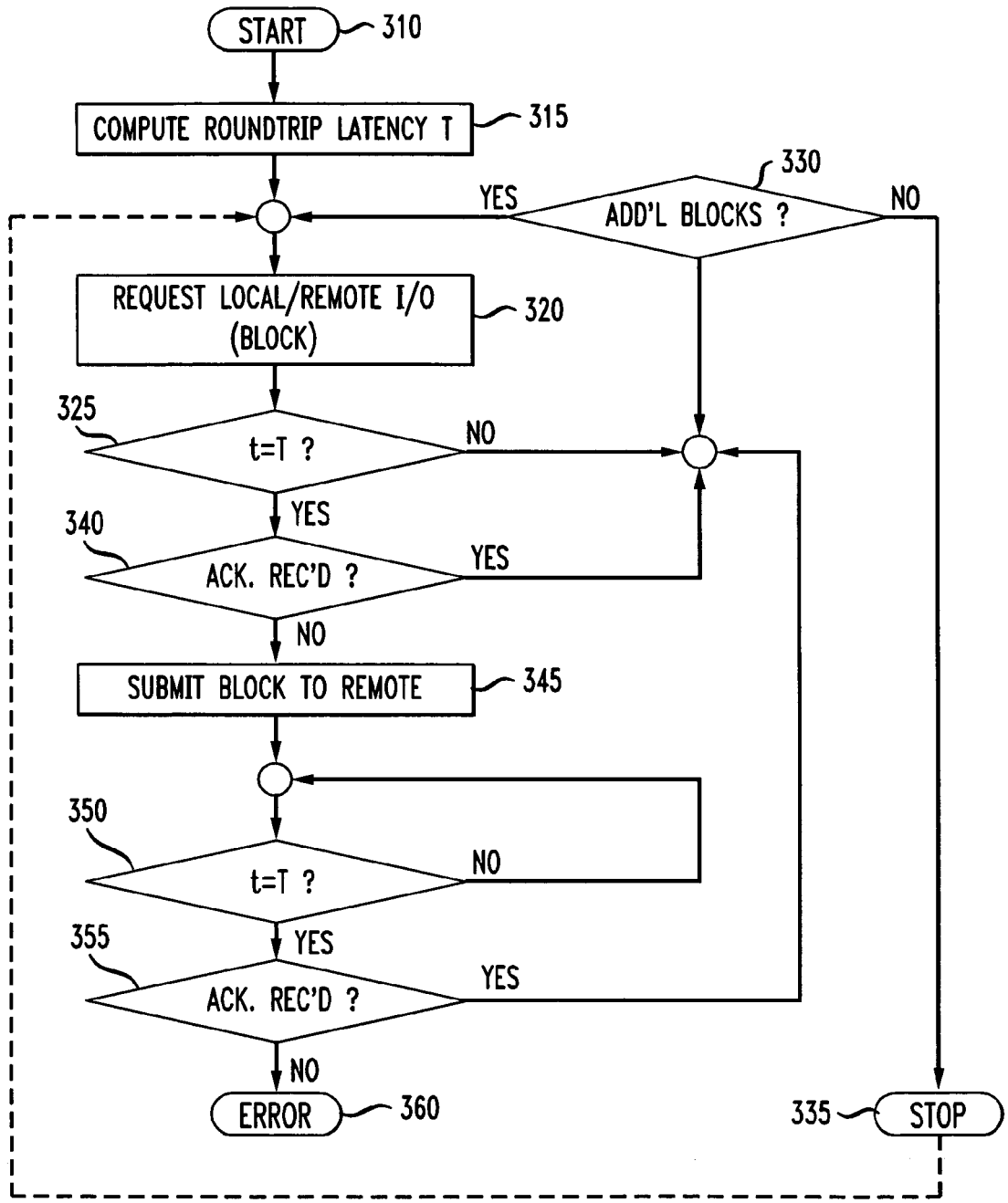
FIG. 3 is a flow chart of a data mirroring method in accordance with an embodiment of the invention.

FIG. 3 illustrates an exemplary embodiment of the asymmetric data mirroring method implemented using the application optimization devices 224. A data mirroring process commences in step 310. As described in more detail below, the storage application 228a, 228b (generally 228) performs the operations of the server 110 shown in FIG. 1. In one embodiment, the storage application 228 is a processor that communicates with the server 214 to offload data storage responsibilities from the server 214.

The storage application 228a measures a predetermined time period T (round trip latency) in step 315. As described, T represents the time needed for a signal to traverse the round trip distance between the storage application 228a and the remote storage 213 plus the maximum "write" time of the remote storage 213. At step 320, the storage application 228 submits an I/O request (such as a write function in the form of a block of data) to the local storage 210 and remote storage 213. A timer t measures the time from submission of the request by the source 208 (i.e., storage application 228a). The timer t is compared to the round trip latency T at step 325. While t remains less than T, the storage application 228a checks for the existence of additional requests that are to be submitted to the source 208 (i.e., local storage 210) and destination 212 (i.e., remote storage 213) at step 330. If there are additional requests, the storage application 228a submits I/O requests to the local storage 210 and remote storage 213 at step 320. If there are no additional requests, as determined in step 330, the writing process comes to a stop in step 335. If the distance between the storage application 228a and the remote storage 213 changes, then the process can be restarted at step 310.

When the timer t equals the round trip latency T, the storage application 228a determines whether an acknowledgment from the destination 212 has been received at step 340. The storage application 228a checks for the existence of additional requests to be submitted to the local storage 210 and remote storage 213 at step 330 and the determination is followed either by an end to the writing process at step 335 or submission of additional requests to the local and remote storages 210, 213 at step 320 as described above.

If an acknowledgment has not been received, the storage application 228a resubmits to the destination, at step 345, all requests (block by block) that have previously been submitted to the local storage 210 and remote storage 213 since the last acknowledgment (if any) while halting submission of new requests. For each request submitted, a timer is started and a copy of the submitted request is maintained by the application optimization device 224a. The timer t again measures time from the submission of the requests and compares it to the predetermined round trip latency T at step 350. If an acknowledgment from destination 212 is again not recorded by the storage application 228a at step 355, an error state is triggered at step 360. On the other hand, if an acknowledgment is received at step 355, the storage application 228a checks for additional requests to be submitted to the destination 212 at step 330 and the process is continued as described above.

While the above description indicates an error alert being triggered after failure to receive acknowledgment for a request that has been submitted twice, this number may be increased or decreased. That is, the error state can be triggered after a request has been submitted once and the storage application 228a has failed to receive an acknowledgment for this request. On the other hand, a particular request may be submitted more than two times and a failure to receive an acknowledgment more than two times can trigger the error alert.

The process can be restarted from step 335 upon the generation of a new I/O request. In this case, there is no need to re-compute the round trip latency as long as the distance between the storage application 228a and the remote storage 213 remains constant. The process may then resume at step 320. Similarly, though not illustrated in FIG. 3, the process may resume at step 320 after the error at step 360 is detected and corrected.

A timer as described above may be a plurality of timers each associated with a submitted request from the storage application 228a. Upon receiving an acknowledgment of the receipt of a particular request, a timer associated with that request may be reset and associated with a next submitted request. As each block of data is submitted by the storage application 228a, a copy of the block of data is stored in a cache or another type of memory associated with the storage application 228a (e.g., the application optimization device 224a) until an acknowledgment of the receipt of the submitted block of data is received by the storage application 228a. If an acknowledgment is received, the timer corresponding to the block of data for which the acknowledgment is received is reset and the copy of this block of data is erased from the application optimization device 224a. This facilitates resubmission of previously submitted requests in case of failure by the storage application 228a in receiving an acknowledgment. The functions of submitting a block of data, "writing" of the submitted block of data by both the local storage 210 and remote storage 213, and submitting an acknowledgment by the remote storage 213 are known and therefore are not described further.

Due to the physical separation between storage application 228 and remote storage 213, there is a difference between the data stored at the local storage 210 and that stored at the remote storage 213 at a particular point in time. That is, a number of blocks of data may be written to the local storage 210 before they are written to the remote storage 213 as a result of the difference in distance between the storage application 228a and each of the storage devices and the time needed to traverse this distance (i.e., round trip of network latency). This number of blocks is the maximum number of blocks of data that may have to be resubmitted by the storage application 228a to the remote storage 213 upon failure by the storage application 228a to receive an acknowledgment according to exemplary embodiments of the present invention.

The number of blocks may depend on a plurality of factors. One factor is the round trip latency or the time needed for a signal to traverse the round trip distance between the storage application 228a and the remote storage 213. This amount of time may also be viewed as the time needed to transport a block of data from the storage application 228a to the remote storage 213 plus the time needed for an acknowledgment signal to travel from the destination 212 to the storage application 228a. Another factor is the frequency at which the I/O requests are generated by the server 214.

As the frequency of I/O requests increase, the number of blocks by which the remote storage 213 differs from the local storage 210 increases. Knowledge of this number (i.e., difference in blocks) from offered load and network latency facilitates construction and management of a cache in the storage application 228a or in a network interface device to compensate for the difference between the contents of the local storage 210 and remote storage 213. In one embodiment, the storage application 228 is a Symmetrix Remote Data Facility (SRDF) (EMC Corporation).

In one embodiment, the storage application optimization layer 108 also includes an optional application optimization device 232 (also referred to as a mid-span memory cache) to achieve asymmetric (i.e., near-synchronous) mirroring. The optional mid-span memory cache 232 may be positioned between the source 208 and the destination 212. The contents of the in-flight data (i.e., data being transmitted from the source 208 to the destination 212) are therefore stored in the mid-span memory cache 232. The data stored in the local storage 210 is equal to the sum of the data stored in the optional mid-span memory cache 232 plus the data stored in remote storage 213. These two devices mirror the data stored in the local storage 210. It should be noted that any of the functions described above and below may be implemented by any of the devices shown in FIG. 2.

Figure 4:
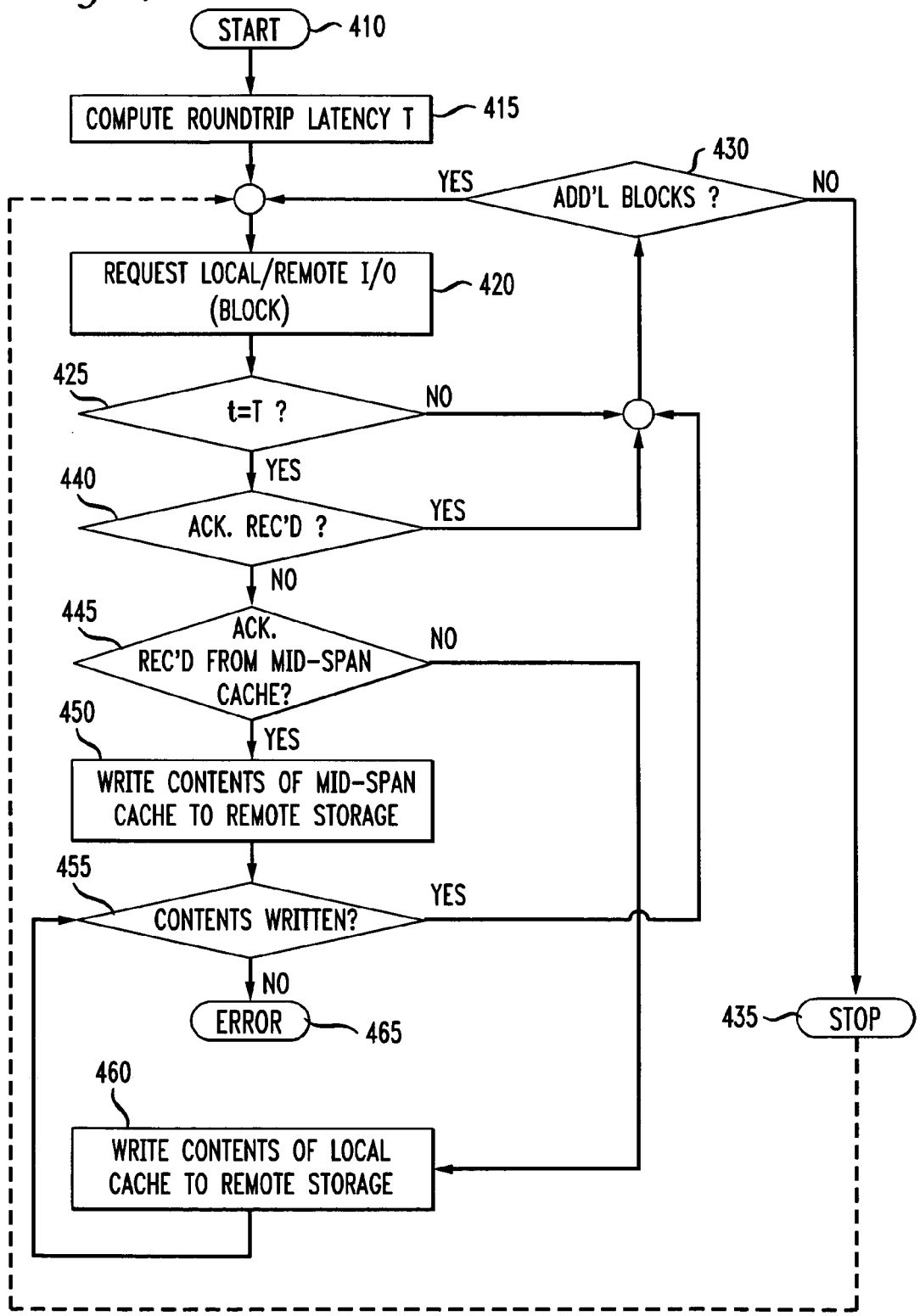
FIG. 4 is a flow chart of an alternative data mirroring method in accordance with an embodiment of the invention.

FIG. 4 is a flow diagram of the ADM method in accordance with having an optional mid-span memory cache 232. A data mirroring process commences in step 410. The source application 228 measures a predetermined time period T (round trip latency) in step 415. As described above, T represents the time required for a signal to traverse the round trip distance between source application 228 and remote storage 213, plus the maximum write time of the remote storage 213. At step 420, storage application 228a submits an I/O request (such as a write function in the form of a block of data) to the local storage 210 and remote storage 213. A timer t measures the time from submission of the request by storage application 228a. The timer t is compared to the round trip latency T at step 425. While t remains less than T, storage application 228a checks for the existence of additional requests that are to be submitted to the local storage 210 and remote storage 213 at step 430. If there are additional requests, storage application 228a submits I/O requests to the local storage 210 and remote storage 213 at step 420. If there are no additional requests, as determined in step 430, the writing process is halted in step 435. If the distance between storage application 228a and the remote storage 213 changes, then the process can be restarted at step 410.

When the timer t equals the round trip latency T, storage application 228a determines whether an acknowledgment from the destination 212 has been received at step 440. The storage application 228a checks for the existence of additional requests to be submitted to the local storage 210 and remote storage 213 at step 430 and the determination is followed either by an end to the writing process at step 435 or submission of additional requests to the local storage 210 and remote storage 213 at step 420 as described above.

If an acknowledgment has not been received, storage application 228a resubmits all requests (block by block) to the remote storage 213 that were previously submitted since the last acknowledgment (if any) while halting submission of new requests. For each request submitted, a copy of the submitted request has been maintained in the source application optimization device 224a and the mid-span memory cache 232. At step 445 if an acknowledgment for each I/O has been received from the mid-span cache 232, the storage application 228a instructs the mid-span cache 232 to write its contents to the remote storage 213 at step 450. If the contents of the mid-span cache 232 are successfully written at step 455, control jumps to step 430. If the acknowledgment is not received from the mid-span memory cache 232 at step 445, then the contents of the storage application 228a (i.e., the source application optimization device 224a) are written to the remote storage 213 at step 460. If the contents of neither the source application optimization device 224a nor the mid-span memory cache 232 are written to the remote storage 213, then an error state is triggered at step 465. During step 455, the timer t again measures the time from the submission of the requests and compares it to the predetermined round trip latency T. If an acknowledgment is not received from the destination 212 after the resubmission, the error state is triggered at step 465.

The process can be restarted from step 435 upon the generation of a new I/O request. In this case, there is no need to re-compute the round trip latency as long as the distance between storage application 228a and remote storage 213 remains constant. The process may then resume at step 420. Similarly, the process could resume at step 420 after the error at step 465 is detected and corrected.

The timer t again measures time from the submission of the requests and compares it to the predetermined round trip latency T at step 450. If an acknowledgment from destination 212 is again not received by storage application 228a at step 455, but acknowledgments from the mid-span memory cache 232 have been received at step 460, then the server 214 instructs the mid-span memory cache 232 to write its contents to remote storage 213 at step 465. If the contents are successfully written at step 470, control jumps to step 430. If the acknowledgment is not received from the mid-span memory cache 232 at step 460, then the contents of the source application optimization device 224a are written to the remote storage 213.

Figure 5:
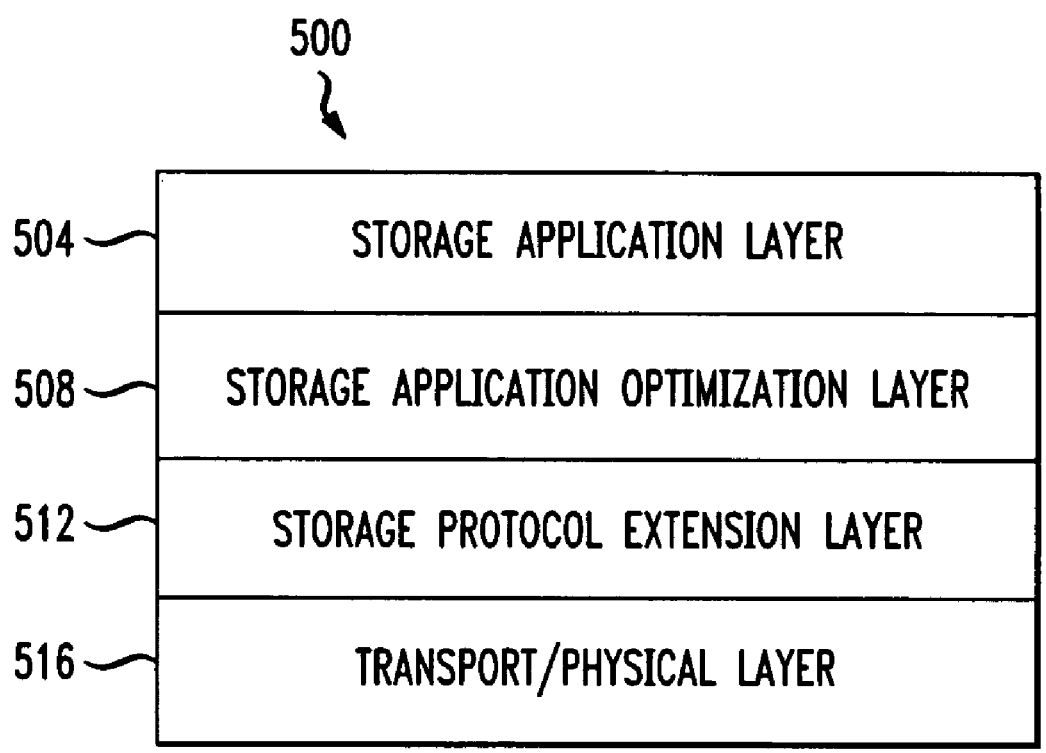
FIG. 5 is a block diagram of a layered model for SAN transport in accordance with an embodiment of the invention.

FIG. 5 shows an abstract model 500 of the architecture of the SAN 200 of FIG. 2. The model 500 includes a storage application layer 504, a storage application optimization layer 508, a storage protocol extension layer 512, and a transport/physical layer 516. As described with respect to FIG. 2, each layer of the model 500 can be implemented by one or more devices.

The storage application layer 504 includes the storage applications 228 and is a layer for providing a standard storage protocol interface (e.g., Enterprise Systems Connection (ESCON), Fiber Connectivity (FICON), or Fibre Channel) or Ethernet. The storage application optimization layer 508 includes the application optimization devices 224 and is a layer where latency management/compensation is accomplished in order to enable the most latency sensitive applications to utilize the transport distance. Techniques employed at this layer include compression, protocol acceleration, and cache management. As described above, the storage application optimization layer 508 enables ADM. The storage protocol extension layer 512 includes the storage protocol extension device 220 and provides protocol extension techniques such as buffer credits. This layer is capable of interfacing with the standard storage protocols and interfacing on the output side with standard transport protocols such as Optical Carrier Levels (OCx) and Ethernet.

The transport/physical layer 516 includes the switches 216 and is the layer where the storage traffic is carried over standard transport protocols. Here, the transport and physical layer functionality of the OSI model are combined as the two are intertwined in the transport of storage protocols. It is essential that protocols that offer predictable and consistent latency and network architectures that manage transport interruptions so as to be transparent to the application are selected.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for transmitting i/o requests on a data channel from a source to a destination, the data channel having a plurality of wavelength channels and a throughput, each wavelength channel having a distinct wavelength, the method comprising:
    multicasting i/o requests to the destination on each of the plurality of wavelength channels;
    multicasting data on each of the plurality of wavelength channels;
    recognizing a failure in one of the plurality of wavelength channels;
    continuing to transmit the data on another of the plurality of wavelength channels without synchronizing a new channel between the source and the destination, whereby an average latency between the source and the destination does not include a time needed to synchronize a new channel when failure occurs;
    adjusting the throughput during the multicasting by using buffer credits to determine a capacity of i/o requests that can be communicated between the source and the destination, to produce a consistent throughput; and
    managing data channel latency by submitting i/o requests to the destination during a predetermined time period associated with the average latency, including
        managing a size of a mid-span memory cache disposed between the source and the destination based on the average latency and the consistent throughput;
        determining the predetermined time period;
        submitting an i/o request to the source and to the destination;
        submitting additional i/o requests to the source and the destination during the predetermined time period;
        storing copies of the i/o request and the additional i/o requests in the mid-span memory cache disposed between the source and the destination;
        continuing submission of additional i/o requests to the source and the destination if an acknowledgement associated with the i/o request is received from the destination;
        resubmitting the i/o request and the additional i/o requests to the destination if an acknowledgement associated with the i/o request is not received from the destination and an acknowledgement associated with the i/o request is not received from the mid-span memory cache prior to completion of the predetermined time period; and
        instructing the mid-span memory cache to resubmit the i/o request and the additional i/o requests to the destination if an acknowledgement associated with the i/o request is not received from the destination and an acknowledgement associated with the i/o request is received from the mid-span cache prior to completion of the predetermined time period.

2. The method of claim 1 wherein the data channel is part of an optical network.

3. The method of claim 1 wherein the data channel is part of a packet-based network.

4. The method of claim 1 wherein the determining the predetermined time period comprises measuring an average round trip time for an average i/o request and an acknowledgement.

5. The method of claim 1 wherein the source halts submission of new i/o requests to the destination if the acknowledgement is not received from the destination.

6. A system for transmitting i/o requests on a data channel from a source to a destination, the data channel having a plurality of wave length channels and a throughput, each wavelength channel having a distinct wavelength, the system comprising:

a storage application for multicasting i/o requests to the destination on each of the plurality of wavelength channels, to multicast data on each of the plurality of wavelength channels, to recognize a failure in one of the plurality of wavelength channels, and to continue to transmit the data on another of the plurality of wavelength channels without synchronizing a new channel between the source and the destination, whereby an average latency between the source and the destination does not include a time needed to synchronize a new channel when failure occurs;

a storage protocol extension device for adjusting the throughput by using buffer credits to determine a capacity of data that can be communicated between the source and the destination to produce a consistent throughput;

an application optimization device including a computer readable recording medium for managing data channel latency by submitting i/o requests to the destination during a predetermined time period associated with the average latency; the application optimization device including a mid-span memory cache, a size of the mid-span memory cache being managed based on the average latency and the consistent throughput, the mid-span memory cache being disposed between the source and the destination for storing copies of the i/o requests submitted to the destination during the predetermined time period, the application optimization device further being for instructing the mid-span memory cache to resubmit the i/o requests to the destination if an acknowledgement associated with the i/o requests is not received from the destination and an acknowledgement associated with the i/o requests is received from the mid-span cache prior to completion of the predetermined time period.

7. The system of claim 6 wherein the data channel is part of an optical network.

8. The system of claim 6 wherein the data channel is part of a packet-based network.

9. The system of claim 6 wherein the application optimization device further comprises at least one timer.

10. A system for transmitting i/o requests on a data channel from a source to a destination, the data channel having a plurality of wavelength channels and a throughput, each wavelength channel having a distinct wavelength, the system comprising:

means for multicasting i/o requests to the destination on each of the plurality of wavelength channels;

means for multicasting data on each of the plurality of wavelength channels;

means for recognizing a failure in one of the plurality of wavelength channels;

means for continuing to transmit the data on another of the plurality of wavelength channels without synchronizing a new channel between the source and the destination, whereby an average latency between the source and the destination does not include a time needed to synchronize a new channel when failure occurs;

means for adjusting the throughput during the multicasting by using buffer credits to determine a capacity of data that can be communicated between the source and the destination, to produce a consistent throughput;

means for managing data channel latency by submitting i/o requests to the destination during a predetermined time period associated with the average latency; and means for storing copies of the i/o requests during the predetermined time period between the source and the destination, the means for managing data channel latency further being for managing a size of a mid-span memory cache disposed between the source and the destination based on the average latency and the consistent throughput, and for instructing the means for storing copies to resubmit the i/o requests to the destination if an acknowledgement is not received from the destination and an acknowledgement is received from the means for storing copies prior to completion of the predetermined time period.

11. The system of claim 10 wherein the data channel is part of an optical network.

12. The system of claim 10 wherein the data channel is part of a packet-based network.

13. The system of claim 10 wherein the means for managing of the data channel latency further comprises:

means for determining the predetermined time period by measuring an average round trip time for an average i/o request and an acknowledgement;

means for submitting an i/o request to the source and to the destination; and means for submitting additional i/o requests to the source and the destination during the predetermined time period.

14. The system of claim 13 further comprising:

means for resubmitting the i/o request and the additional i/o requests to the destination if the acknowledgement from the means for storing copies is not received prior to completion of the predetermined time period; and means for continuing submission of additional i/o requests to the source and the destination if the acknowledgement from the destination is received.

15. The system of claim 14 further comprising means for halting submission of new i/o requests to the source and the destination if the acknowledgement is not received.

* * * * *